United States Patent [19]

Yamada et al.

[11] 4,431,700

[45] Feb. 14, 1984

[54] MAGNETIC RECORDING MEDIUM

[75] Inventors: Yasuyuki Yamada; Nobuo Tsuji; Yasuyuki Tanaka; Koichi Yamauchi, all of Odawara, Japan

[73] Assignee: Fuji Photo Film Co., Ltd., Minami-ashigara, Japan

[21] Appl. No.: 451,350

[22] Filed: Dec. 20, 1982

[30] Foreign Application Priority Data

Dec. 28, 1981 [JP] Japan .................... 56-209902

[51] Int. Cl.$^3$ ............................................. H01F 10/02
[52] U.S. Cl. ................................. 428/336; 428/425.9; 428/457; 428/473.5; 428/477.7; 428/481; 428/532; 428/694; 428/695; 428/900
[58] Field of Search ............... 428/336, 900, 695, 694, 428/425.9, 457, 532, 493.5, 481, 522, 477.7

Primary Examiner—Bernard D. Pianalto

Attorney, Agent, or Firm—Armstrong, Nikaido, Marmelstein & Kubovcik

[57] ABSTRACT

The present invention relates to a magnetic recording medium excellent in S/N ratio and abrasion resistance, which comprises a non-magnetic support and a magnetic recording layer coated thereon, consisting of a ferromagnetic fine powder and a binder, in which the binder contains (1) nitrocellulose having an average polymerization degree of 50 to 300 and a nitrification degree of 10.7 to 13 and (2) a polyurethane resin having a number average molecular weight of 40,000 to 100,000, obtained from diphenylmethane diisocyanate and a mixture of polyneopentyl adipate having an average molecular weight of 800 to 2000 and polybutylene adipate having an average molecular weight of 800 to 2000 in a mixing proportion by weight of 2/8 to 9/1.

14 Claims, No Drawings

MAGNETIC RECORDING MEDIUM

BACKGROUND OF THE INVENTION

1. Field of the Invention

This invention relates to a magnetic recording medium excellent in surface property and more particularly, it is concerned with a magnetic recording medium having a coated recording layer whose binder component is improved.

2. Description of the Prior Art

As a binder for a magnetic recording medium, there have hitherto been used vinyl chloride-vinyl acetate copolymers, cellulose derivatives, acrylic resins (copolymers of acrylic acid or methacrylic acid with esters thereof), polyurethane resins, vinylidene copolymers, synthetic rubbers and polyesters individually or in combination. Many other binders are known, for example, in which thermoplastic resins having hydroxyl groups and polyisocyanates are jointly used to harden the coating. However, binders capable of giving an excellent surface property suitable for a high density video tape have not always been obtained by the known method or combination of components.

SUMMARY OF THE INVENTION

It is an object of the present invention to provide a magnetic recording medium having an excellent surface property.

It is another object of the present invention to provide a magnetic recording medium excellent in S/N ratio as well as abrasion resistance.

It is a further object of the present invention to provide a magnetic recording medium with a high chroma S/N and abrasion resistance, which comprises a non-magnetic support and a magnetic recording layer using nitrocellulose and polyurethane resin in combination as a binder.

These objects can be attained by a magnetic recording medium comprising a non-magnetic support and a magnetic recording layer consisting mainly of a ferromagnetic fine powder and a binder, characterized in that the binder contains (1) nitrocellulose having an average polymerization degree of about 50 to 300 and a nitrification degree of 10.7 to 13.0 and (2) a polyurethane resin having a number average molecular weight of 40,000 to 100,000, obtained from diphenylmethane diisocyanate and a mixture of polyneopentyl adipate having an average molecular weight of 800 to 2000 and polybutylene adipate having an average molecular weight of 800 to 2000 in a mixing proportion by weight of 2/8 to 9/1.

DETAILED DESCRIPTION OF THE INVENTION

The inventors have made detailed studies on the chemical structure of nitrocellulose and polyurethane to find out a binder excellent in surface property and thus have developed a magnetic recording medium excellent in surface property, i.e. S/N ratio.

Accordingly, the present invention provides an improved magnetic recording medium comprising a non-magnetic support and a magnetic recording layer coated thereon, consisting of a ferromagnetic fine powder and a binder, characterized in that the binder contains (1) nitrocellulose having an average polymerization degree of about 50 to 300 and a nitrification degree of 10.7 to 13.0 and (2) a polyurethane resin having a number average molecular weight of 40,000 to 100,000, obtained from diphenylmethane diisocyanate (MDI) and a mixture of polyneopentyl adipate (PNA) having an average molecular weight of 800 to 2000 and polybutylene adipate (PBA) having an average molecular weight of 800 to 2000 in a mixing proportion by weight of 2/8 to 9/1. To the binder used herein can further be added a low molecular weight polyisocyanate compound, preferably, in a proportion by weight of 5 to 40% based on the total binder to form a three-dimensional network structure in the magnetic layer, thereby increasing further the physical strength.

In the magnetic recording medium of the present invention, a calendering treatment can be carried out very sufficiently by the synergistic effect of nitrocellulose having a higher heat softening temperature and a specified polyurethane capable of imparting a suitable softness, whereby to improve remarkably the surface smoothness and S/N ratio.

The nitrocellulose used in the present invention has generally an average polymerization degree of 50 to 300, preferably 80 to 200 and a nitrification degree of 10.7 to 13.0, preferably 11.5 to 12.2. If the polymerization degree is too small, film-forming property is inferior and a tough film cannot be obtained, while if too large, a large amount of solvent is required for obtaining a predetermined viscosity and it is necessary to evaporate the large amount of solvent in the step of coating. If the degree of nitrification is too large, the dispersibility of a magnetic powder and the abrasion resistance are inferior, while if too small, the abrasion resistance and miscibility with other components are inferior.

The average molecular weights of polyneopentyl adipate and polybutylene adipate in the polyester part of the polyurethane resin are both 800 to 2000. If the molecular weight is less than 800, the polyurethane resin is too hard, while if more than 2000, it is too soft to hold sufficient the durability to friction with a head when it is in the magnetic recording layer.

The mixing ratio of the above described two esters should be 2/8 to 9/1 by weight, since if the ratio of polyneopentyl adipate is more than this range, the resin is too hard, while if less than this range, the resin is too soft. As a polyisocyanate for the polyurethane resin, diphenylmethane diisocyanate is most preferable in this range of the combination of these esters from the fact that diphenylmethane diisocyanate gives rigidity to the polyurethane molecule.

In addition, the polyurethane resin should have a number average molecular weight of 40,000 to 100,000, since if the molecular weight is more than 100,000, the polyurethane resin is less soluble in solvents, while if less than 40,000, the physical strength is small.

The low molecular weight isocyanate optionally used in the present invention is selected from aliphatic, alicyclic and aromatic di-, tri- and tetraisocyanates having at least two isocyanate groups and their adducts, for example, isocyanates such as ethane diisocyanate, butane-ω, ω'-diisocyanate, hexane-ω,ω'-diisocyanate, 2,2-dimethylpentane-ω,ω'-diisocyanate, 2,2,4-trimethylpentane-ω,ω'-diisocyanate, decane-ω,ω'-diisocyanate, ω,ω'-diisocyanato-1,3-dimethylbenzol, ω,ω'-diisocyanato-1,2-dimethylcyclohexane, ω,ω'-diisocyanato-1,4-diethylbenzol, ω,ω'-diisocyanato-1,5-dimethylnaphthalene, ω,ω'-diisocyanato-n-propylbiphenyl, 1,3-phenylene diisocyanate, 1-methylbenzol-2,4-diisocyanate, 1,3-dimethylbenzol-2,6-diisocyanate, naphthalene-1,4- diisocyanate, 1,1'-dinaphthyl-2,2'-diisocyanate, biphenyl-2,4'-diisocyanate, 3,3'-dimethylbiphenyl-4,4'-diisocyanate, diphenylmethane-4,4'-diisocyanate, 2,2'-dimethyldiphenylmethane-4,4'-diisocyanate, 3,3'-dimethoxydiphenylmethane-4,4'-diisocyanate, 4,4'-diethoxydiphenylmethane-4,4'-diisocyanate, 1-methylbenzol-2,4,6-triisocyanate, 1,3,5-trimethylbenzol-2,4,6-triisocyanate, diphenylmethane-2,4,4'-triisocyanate, triphenylmethane-4,4',4''-triisocyanate, tolylene diisocyanate and 1,5-naphthylene diisocyanate; dimers or trimers of these isocyanates and adducts of these isocyanates and dihydric or trihydric polyalcohols. Examples of the adduct are adducts of trimethylolpropane and tolylene diisocyanate or hexamehylene diisocyanate.

Preparation of the magnetic recording medium according to the present invention is generally carried out by dispersing a ferromagnetic fine powder, additives such as dispersing agents, lubricants, abrasives antistatic agents and the like and binder composition in an organic solvent, coating the resulting magnetic coating composition onto a non-magnetic support and then drying. In this case, the commonly used ferromagnetic fine powders, additives and non-magnetic supports can similarly be used.

Suitable materials which can be used for the non-magnetic support are various plastics, for example, polyesters such as polyethylene terephthalate, polyethylene-2,6-naphthalate and the like; polyolefins such as polyethylene, polypropylene and the like; cellulose derivatives such as cellulose triacetate, cellulose diacetate, cellulose acetate butyrate, cellulose acetate propionate and the like; vinyl resins such as polyvinyl chloride, polyvinylidene chloride and the like; polycarbonates, polyimides and polyamide imides.

Useful examples of the ferromagnetic powders which can be used in the present invention are $\gamma$-Fe$_2$O$_3$, Co-doped $\gamma$-Fe$_2$O$_3$, Fe$_3$O$_4$, Co-doped Fe$_3$O$_4$, Berthollide compounds of $\gamma$-Fe$_2$O$_3$ and Fe$_3$O$_4$(FeOx: $1.33<x<1.50$), Co-doped Berthollide compounds of $\gamma$-Fe$_2$O$_3$ and Fe$_3$O$_4$(FeOx: $1.33<x<1.50$), CrO$_2$, Co-Ni-P alloys, Co-Ni-Fe alloys, Co-Ni-Fe-B alloys, Fe-Ni-Zn alloys, Fe-Mn-Zn alloys, Fe-Co-Ni-P alloys and Ni-Co alloys, as described in Japanese Patent Publication Nos. 14090/1969, 18372/1970, 22062/1972, 22513/1972, 28466/1971, 38755/1971, 4286/1972, 12422/1972, 17284/1972, 18509/1972, 18573/1972, 10307/1964 and 39639/1973, U.S. Pat. Nos. 3,026,215, 3,031,341, 3,100,194, 3,242,005 and 3,389,014, British Pat. Nos. 752,659, 782,762 and 1,007,323, French Pat. No. 1,107,654 and West German OLS No. 1,281,334.

The ferromagnetic fine powders have a grain size of preferably about 0.2 to 1 $\mu$m in length with a length to width ratio of 1:1 to 20:1.

In these ferromagnetic iron oxides can be incorporated divalent metals such as Cr, Mn, Co, Ni Cu and Zn in a proportion of 0 to 10 atom % based on the iron oxides. Moreover, the above described chromium dioxide CrO$_2$ contains 0 to 20% by weight of metals such as Na, K, Ti, V Mn, Fe, Co, Ni, Te, Ru, Sn, Ce and Pb, semiconductors such as P, Sb and Te and oxides thereof.

Suitable dispersing agents are fatty acids containing about 12 to 18 carbon atoms represented by the general formula R$_1$COOH wherein R$_1$ is an alkyl or alkenyl group containing 11 to 17 carbon atoms, for example, caprylic acid, capric acid, lauric acid, myristic acid, palmitic acid, stearic acid, oleic acid, elaidic acid, linolic acid, linolenic acid, stearolic acid and the like; metallic soaps comprising the alkali metal (Le, Na, K, etc.) salts or the alkaline earth metal (Mg, Ca, Ba, etc.) salts of the above described fatty acids; fluorine compounds of the above described fatty acid esters; amides of the above described fatty acids; polyalkylene oxides alkylphosphoric acid esters; lecithin; and trialkyl polyolefin oxy quaternary ammonium salts, the alkyl group having 1–5 carbon atoms and the olefin being ethylene, propylene or the like. In addition, higher alcohols containing about 12 or more carbon atoms and sulfuric acid esters thereof. These dispersing agents are described in Japanese Patent Publication Nos. 28369/1964, 17945/1969 and 15001/1973 and U.S. Pat. Nos. 3,387,993 and 3,470,021.

Suitable lubricants which can be used in the present invention include silicone oils such as dialkylpolysiloxanes (alkyl: $C_1$–$C_5$), dialkoxypolysiloxanes (alkoxy: $C_1$–$C_4$), monoalkylmonoalkoxypolysiloxanes (alkyl: $C_1$–$C_5$; alkoxy: $C_1$–$C_4$), phenylpolysiloxanes and fluoroalkylpolysiloxanes (alkyl: $C_1$–$C_5$); electrically conductive fine powders such as graphite, inorganic fine powders such as molybdenum disulfide and tungsten disulfide; plastic fine powders such as polyethylene, polypropylene, polyethylene-vinyl chloride copolymers and polytetrafluoroethylene; $\alpha$-olefin polymers; unsaturated aliphatic hydrocarbons liquid at normal temperature ($\alpha$-olefins having double bond combined with terminal carbon, number of carbons about 20); fatty acid esters from monocarboxylic fatty acids of $C_{12}$–$C_{20}$ and monohydric alcohols of $C_3$–$C_{12}$; and fluorocarbons. These lubricants are described in Japanese Patent Publication Nos. 18064/1966, 23889/1968, 40461/1971, 15621/1972, 18482/1972, 28043/1972, 32001/1972 and 5042/1975, U.S. Pat. Nos. 3,470,021, 3,492,235, 3,497,411, 3,523,086, 3,625,760, 3,630,772, 3,634,253, 3,642,539 and 3,687,725, IBM Technical Disclosure Bulletin, Vol. 9, No. 7, page 779 (December 1966), and ELECTRONIK, No. 12, page 380 (1961), West Germany.

Typical abrasive agents which can be used in the present invention include fused alumina, silicon carbide, chromium oxide (Cr$_2$O$_3$), corundum, synthetic corundum, diamond, synthetic diamond, garnet, emery (main components: corundum and magnetite) and the like. Examples of the abrasives are described in Japanese Patent Application No. 26749/1973, U.S. Pat. Nos. 3,007,807, 3,041,196, 3,293,066, 3,630,910, and 3,687,725, British Pat. No. 1,145,349, West German Pat. Nos. 853,211 and 1,001,000.

Antistatic agents which can be used in the present invention include electrically conductive powders such as graphite, carbonblack and carbon black graft polymers; natural surface active agents such as saponin; nonionic surface active agents such as alkylene oxide based, glycerol based and glycidol based surface active agents; cationic surface active agents such as heterocyclic compounds, e.g. pyridine and the like; higher alkylamines, quaternary ammonium salts, phosphoniums, sulfoniums and the like; anionic surface active agents containing acid groups such as carboxylic acid groups, sulfonic acid groups, phosphoric acid groups, sulfate groups, phosphate groups and the like; amphoteric surface active agents such as sulfates or phosphates of amino acids, amino sulfonic acids, amino alcohols and the like; etc.

Examples of the surface active agents which can be used as antistatic agents are described in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174 and 3,545,974, West German Patent Application (OLS) No. 1,942,665, British Pat. Nos. 1,077,317 and 1,198,450, Ryohei Oda et al., "Kaimen Kassei Zai no Gosei to so no Oyo" (Synthesis of Surface Active Agents and Their Applications), Maki Shoten, Tokyo (1964), A. M. Schwrats et al., "Surface Active Agents", Interscience Publications Corp., New York (1958), J. P. Sisley et al., "Encyclopedia of Surface Active Agents", Vol. 2, Chemical Publishing Co., New York (1964), "Kaimen Kassei Zai Binran (Handbook of Surface Active Agents)", 6th Ed., Sangyo Tosho Co., Tokyo (Dec. 20, 1966), etc.

These surface active agents can be used individually or in combination with each other. These surface active agents are generally used as antistatic agents, but in some cases, they are used for other purposes, for example for improving dispersibility, magnetic properties and lubricity, or as an auxiliary coating agent.

The above described magnetic powder, binder, dispersing agent, lubricant, abrasive agent, antistatic agent and solvent are well blended or kneaded to prepare a coating composition. For kneading, the magnetic powder and other components are charged in a kneading machine simultaneously or separately. For example a magnetic powder is added to a solvent containing a dispersing agent, kneaded for a predetermined period of time, then mixed with other components and kneaded sufficiently to prepare a magnetic coating composition Various kneading machines are used for the kneading and dispersing, for example, two roll mills, three roll mills, ball mills, pebble mills, trommel mills, sand grinders, Szegvari attriters, high speed impeller dispersing machines, high speed stone mills, high speed impact mills, kneaders, high speed mixers, homogenizers, ultrasonic dispersing machines, etc. The kneading and dispersing techniques are described in T. C. Patton, "Paint Flow and Pigment Dispersion", published by John Wiley & Sons (1964) and U.S. Pat. Nos. 2,581,414 and 2,855,156.

Typical organic solvents which can be used in the coating include ketones such as acetone, methyl ethyl ketone, methyl isobutyl ketone, cyclohexanone and the like; esters such as methyl acetate, ethyl acetate, butyl acetate, ethyl lactate, glycol monoethyl ether acetate and the like; aromatic hydrocarbons such as benzene, toluene, xylene and the like; and chlorinated hydrocarbons such as methylene chloride, ethylene chloride, carbon tetrachloride, chloroform, ethylene chlorohydrin, dichlorobenzene and the like.

In the present invention, it is required that the binder contains basically nitrocellulose and a polyol and isocyanate, but of course, other components such as nitrile rubbers, polyurethane resins and their prepolymers can further be added so as to control the hardness of the magnetic layer.

The amounts of the above described components to be used as follows: The proportion by weight of a ferromagnetic fine powder and binder is generally 100: 13-50, preferably 100: 17-30. The proportion by weight of nitrocellulose and the polyurethane resin is generally 100: 130-20, preferably 100: 100-40. The quantity of a solvent is 3.5-4.5 times as much as a ferromagnetic fine powder. To 100 parts by weight of a binder there are used 0.5-20 parts by weight of a dispersing agent, 0.2-20 parts by weight of a lubricant, 0.5-20 parts by weight of an abrasive agent, 0.2-20 parts by weight of an electrically conductive fine powder as antistatic agent and 0-3 parts by weight of a surface active agent as antistatic agent.

The above described ferromagnetic fine powder, binder, dispersing agent, lubricant, abrasive antistatic agent and solvent are well blended to prepare a magnetic coating composition and then cooled onto a nonmagnetic support using coating methods such as air doctor coating, blade coating, air knife coating, squeeze coating, dip coating, reverse roll coating, transfer roll coating, gravure coating, kiss coating, cast coating, spray coating and the like, and other coating methods can also be used. These coating methods are described in, for example, "Coating Kogaku (Coating Engineering)", page 253 to 277, published by Asakura Shoten, Tokyo (Mar. 20, 1971). The coating thickness is generally 1 to 18 μm on dry basis depending on the use, shape (film, tape, sheet, etc.) and standard of the magnetic recording medium.

The drying temperature and time depends on the variety of a solvent, its quantity in the coating composition and its residual quantity. In general, the drying temperature is 40° to 100° C. and is gradually raised with the progress of drying, while the drying time is about 5 seconds to 3 minutes.

After drying, the magnetic recording medium can once be rolled up, but it is preferably subjected to a calendering treatment without rolling up in order to increase the S/N ratio. The calendering treatment can be carried out in known manner, for example, by the supercalendering method comprising passing through a metal roll and a cotton roll or synthetic resin roll (nylon, epoxy resin, polyurethane resin, etc.), or a metal roll and a metal roll.

The conditions of this calendering treatment are suitably adjusted depending on the variety of a tape and are generally within the following ranges: nip pressure of calendering rolls (linear pressure): 80-300 Kg/cm, preferably 100-240 Kg/cm; tape transporting speed: 30-200 m/min, preferably 60-150 m/min; and roll temperature: 25°-120° C., preferably 45°-80° C. If the nip pressure is less than 80 Kg/cm, smoothening of the surface of the magnetic layer is not sufficient, while if more than 300 Kg/cm, the life of calendering rolls is short and this is disadvantageous from an economical point of view. If the roll temperature is lower than 25° C., smoothening of the surface of the magnetic layer is not sufficient and if higher than 120° C., the life of calendering rolls is short and this is disadvantageous from an economical point of view.

The present invention will be explained in detail with reference to the following examples. It will be obvious to those skill in the art that various changes and modifications can be made in the components, ratio, operational orders and the like without departing from the spirit of the present invention. Therefore, the present invention should not be construed as being limited to the following examples. All parts, percents, ratios and the like are to be taken as those by weight unless otherwise indicated.

EXAMPLE 1

| (1) | Co-doped $\gamma$-$Fe_2O_3$ powder (Hc 630 Oe, mean grain size 0.33μ) | 300 parts |
|---|---|---|
| (2) | Nitrocellulose (average polymerization degree 80, nitrification | 35 parts |

-continued

| | | |
|---|---|---|
| | degree 122) | |
| (3) | Polyurethane Resin (reaction product of MDI with a mixture of PNA with a molecular weight of 1000 and PBA with a molecular weight of 1000 in a proportion by weight of 1/1, number average molecular weight 60,000) | 26 parts |
| (4) | Carbon Black (electrically conductive carbon black, mean grain size 30 mµ) | 20 parts |
| (5) | Abrasives (α-alumina with a mean grain size of 0.5µ/γ-alumina with a mean grain size of 0.02µ = 78/22 | 24 parts |
| (6) | Myristic Acid | 7 parts |
| (7) | Butyl Stearate | 1 parts |
| (8) | Solvents (MEK/butyl acetate = 3/7) | 780 parts |

The above described components were well mixed and dispersed using a ball mill and sand mill to prepare a magnetic coating composition. Finally, 16 parts as solid of a reaction product of 1 mol of trimethylolpropane and 3 mols of toluene diisocyanate (Colonate L manufactured by Nippon Polyurethane Co.) was added thereto as (9) low molecular weight polyisocyanate component obtain a finished composition. The resuting magnetic coating was coated onto a base of polyethylene terephthalate with a thickness of 15µ undercoated with a polyester consisting of triethylene glycol, ethylene glycol and terephthalic acid to give a coating thickness of 5µ on dry basis, dried, subjected to a supercalender roll treatment to finish the surface of the magnetic layer and then slit in a width of ½ inch to obtain a magnetic tape (Sample No. 1).

EXAMPLE 2

The procedure of Example 1 was repeated except using nitrocellulose with an average polymerization degree of 110 and nitrification degree of 11.2 instead of Component (2) of Example 1 and a polyurethane resin, reaction product of MDI with a mixture of PNA with a molecular weight of 1000 and PBA with a molecular weight of 1200 in a proportion by weight of 6:4 and having a number average molecular weight of 80,000 instead of Component (3) of Example 1, thus obtaining a magnetic tape (Sample No. 2).

COMPARATIVE EXAMPLE 1

The procedure of Example 1 was repeated except using vinyl chloride/vinyl acetate copolymer (VAGH manufactured by Union Carbide Co.) instead of Component (2) of Example 1, thus obtaining a magnetic tape (Comparative Sample 1).

COMPARATIVE EXAMPLE 2

The procedure of Example 1 was repeated except using an epoxy resin (Epikote No. 1001 manufactured by Shell Chemical Co.) instead of Component (3) of Example 1, thus obtaining a magnetic tape (Comparative Sample 2).

COMPARATIVE EXAMPLE 3

The procedure of Example 1 was repeated except using a polyurethane resin having an average molecular weight of 70,000, obtained from PBA with a molecular weight of 2000 and toluene diisocyanate, thus obtaining a magnetic (Comparative Sample No. 3).

EXAMPLES 3 TO 5

The procedure of Example 1 was repeated except using the following nitrocelluloses and polyurethanes shown in Table 1 in place of those of Example 1, thus obtaining magnetic recording tapes (Sample Nos. 3 to 5):

TABLE 1

| | Nitrocellulose | | Polyurethane Resin | | | |
|---|---|---|---|---|---|---|
| Example No. | Average Polymerization Degree | Nitrification Degree | PNA (A) Polymerization Degree | PBA (B) Polymerization Degree | (A)/(B) Mixing Ratio | Number Average Molecular Weight |
| 3 | 250 | 12.2 | 1,000 | 1,200 | 7/3 | 80,000 |
| 4 | 280 | 11.2 | 2,000 | 2,000 | 2/8 | 40,000 |
| 5 | 100 | 12.1 | 1,000 | 2,000 | 9/1 | 60,000 |

EXAMPLE 6

The procedure of Example 1 was repeated except not using Component (9), low molecular weight polyisocyanate of Example 1 and using 50 parts of Component (2), nitrocellulose and 27 parts of Component (3), polyurethane of Example 1, thus obtaining a magnetic tape (Sample No. 6).

The characteristics of the samples and comparative samples obtained in the above described Examples and Comparative Examples are summarized in Table 2:

TABLE 2

| | Chroma S/N (dB*) | Abrasion Resistance (time**) |
|---|---|---|
| Sample No. | | |
| 1 | 0 | at least 30 min |
| 2 | +0.4 | " |
| 3 | +0.2 | " |
| 4 | 0 | " |
| 5 | +0.1 | " |
| 6 | +0.3 | " |
| Comparative Sample No. | | |
| 1 | −0.5 | at most 5 min |
| 2 | −0.4 | " |
| 3 | −0.6 | " |

Note:
*S/N of video color signal represented by relative value based on ± 0 dB of Sample No. 1
**Time in still frame test when still image can be reproduced using VTR (NV-8310 made by Matsushita Denki Sangyo KK) as to Sample Tape set in Cassette Half for VHS It will clearly be understood from the results of Examples and Comparative Examples that when using the binder containing nitrocellulose and the polyurethane resin according to the present invention, there is obtained a magnetic recording medium that is particularly excellent in chroma S/N as well as abrasion resistance.

What is claimed is:
1. A magnetic recording medium comprising a nonmagnetic support and a magnetic recording layer coated thereon, consisting of a ferromagnetic fine powder and a binder, in which the binder contains (1) nitrocellulose having an average polymerization degree of

50 to 300 and a nitrification degree of 10.7 to 13 and (2) a polyurethane resin having a number average molecular weight of 40,000 to 100,000, obtained from diphenylmethane diisocyanate and a mixture of polyneopentyl adipate having an average molecular weight of 800 to 2000 and polybutylene adipate having an average molecular weight of 800 to 2000 in a mixing proportion by weight of 2/8 to 9/1.

2. The magnetic recording medium of claim 1, wherein the binder further contains a low molecular weight polyisocyanate.

3. The magnetic recording medium of claim 2, wherein the low molecular weight polyisocyanate is in a proportion by weight of 5 to 40% to the binder.

4. The magnetic recording medium of claim 2, wherein the low molecular weight polyisocyanate is selected from the group consisting of aliphatic, alicyclic and aromatic di-, tri- and tetraisocyanates, dimers and trimers thereof and addition products thereof with dihydric or trihydric alcohols.

5. The magnetic recording medium of claim 1, wherein the binder further contains a solvent, dispersing agent, lubricant, abrasives and antistatic agent.

6. The magnetic recording medium of claim 1, wherein the non-magnetic support is of polyethylene terephthalate, polyethylene-2,6-naphthalate, polyethylene, polypropylene, cellulose triacetate, cellulose diacetate, cellulose acetate butyrate, cellulose acetate propionate, polyvinyl chloride, polyvinylidene chloride, polycarbonate, polyimide or polyamideimide.

7. The magnetic recording medium of claim 1, wherein the ferromagnetic fine powder is selected from the group consisting of powders of $\gamma$-$Fe_2O_3$, Co-doped $\gamma$-$Fe_2O_3$, $Fe_3O_4$, Co-doped $Fe_3O_4$, Berthollide compounds of $\gamma$-$Fe_2O_3$ and $Fe_3O_4$ (FeOx: $1.33<x<1.50$), Co-doped Berthollide compounds of $\gamma$-$Fe_2O_3$ and $Fe_3O_4$ (FeOx: $1.33<x<1.50$), $CrO_2$, Co-Ni-P alloys, Co-Ni-Fe alloys, Co-B-Ni-Fe alloys, Fe-Ni-Zn alloys, Fe-Mn-Zn alloys, Fe-Co-Ni-P alloys and Ni-Co alloys.

8. The magnetic recording medium of claim 7, wherein the ferromagnetic iron oxide further contains 0 to 10 atom % of at least one divalent metal selected from the group consisting of Cr, Mn, Co, Ni, Cu and Zn.

9. The magnetic recording medium of claim 7, wherein the ferromagnetic chromium dioxide further contains 0 to 20 % by weight of at least one element selected from the group consisting of Na, K, Ti, V, Mn, Fe, Co, Ni, Te, Ru, Sn, Ce, Pb, P, Sb and Te and oxides thereof.

10. The magnetic recording medium of claim 1, wherein the binder is in a proportion by weight of 13 to 50 to 100 of the ferromagnetic fine powder.

11. The magnetic recording medium of claim 1, wherein the nitrocellulose and polyurethane resin are in a proportion by weight of 100:130–20.

12. The magnetic recording medium of claim 1, wherein the magnetic recording layer has a thickness of 1 to 18 $\mu$m on dry basis.

13. The magnetic recording medium of claim 1, wherein the surface of the magnetic recording medium is finished by a supercalendering treatment.

14. The magnetic recording medium of claim 13, wherein the supercalendering treatment is carried out with a linear nip pressure of rolls of 80 to 300 Kg/cm, tape transporting speed of 30 to 200 m/min and roll temperature of 25° to 120° C.

* * * * *